United States Patent Office 3,271,676
Patented Sept. 6, 1966

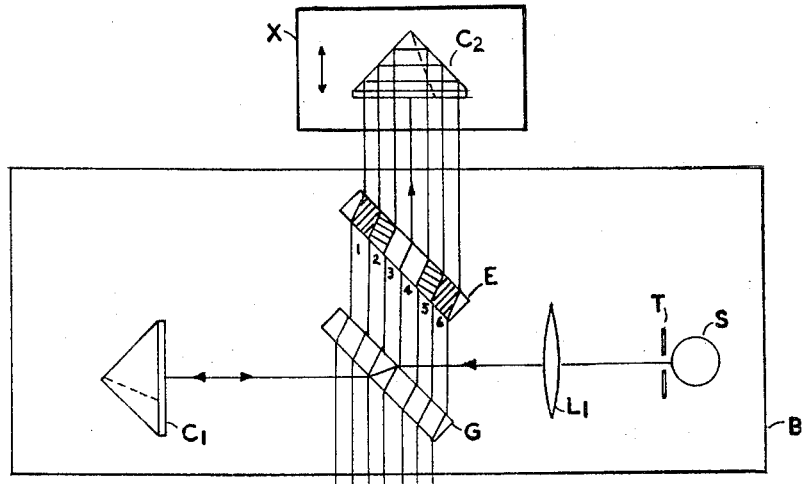
FIG 1
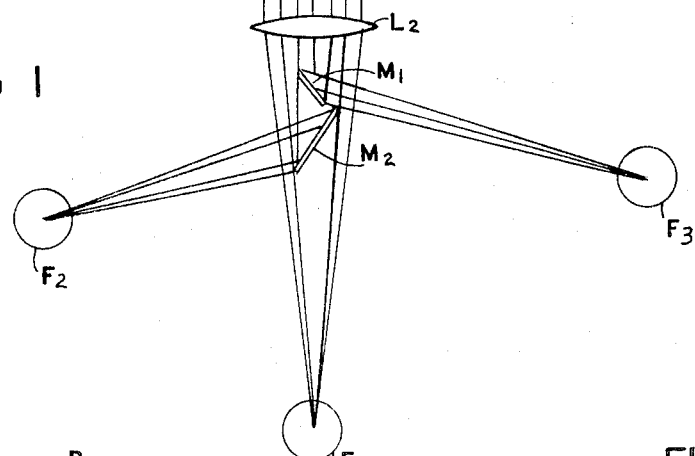
FIG 4
FORWARD
FIG 4A
REVERSE
INVENTOR.
ANWAR K. CHITAYAT
BY

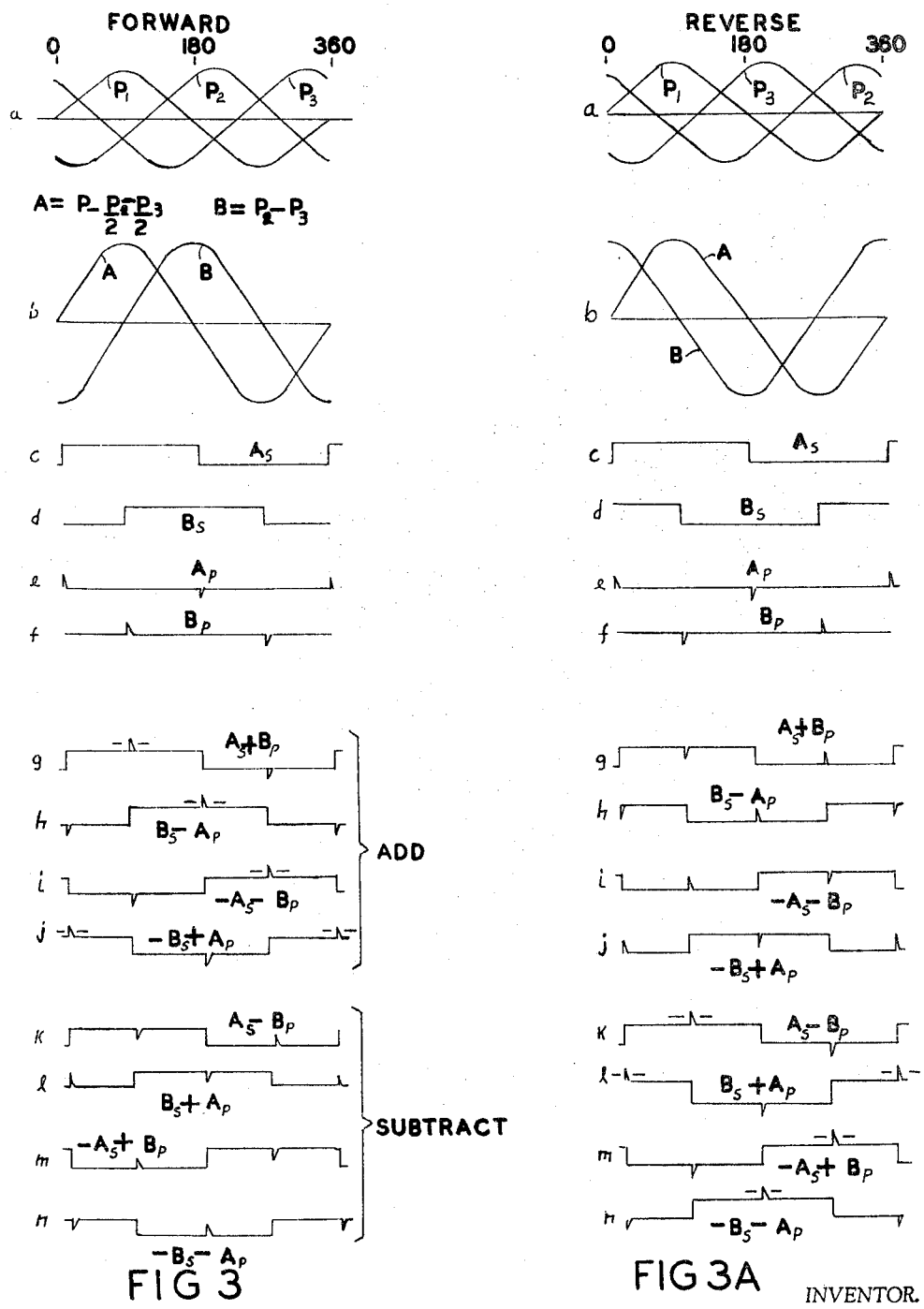

1

3,271,676
THREE DETECTOR CYCLE COUNTING MEANS
Anwar K. Chitayat, Plainview, N.Y., assignor to
Optomechanisms, Inc., Plainview, N.Y.
Original application Jan. 23, 1963, Ser. No. 253,473.
Divided and this application Jan. 25, 1963, Ser. No.
254,015
3 Claims. (Cl. 324—83)

This invention relates to three detector cycle counting means and more particularly to means for counting fractional cycles of phase shift.

This application is a division of my co-pending application entitled "Automatic Measuring Interferometer," Serial No. 253,473 filed: January 23, 1963.

The invention is illustrated in connection with an improvement of the Michelson type interferometer. Means are provided to produce three variable waves which differ 120° in phase. The fringes produced by these waves and a reference wave are separated and picked-up by three detectors. The outputs of the detectors are combined so as to provide direction sensitive counting means for counting the fringes and thereby measure the position of a movable member with an accuracy of $\frac{1}{12}$ of the fringe wavelength.

Accordingly, a principal object of the invention is to provide new and improved cycle counting means.

Another object of the invention is to provide new and improved automatic counting means.

Another object of the invention is to provide new and improved means for precise measurement.

Another object of the invention is to provide new and improved means for precise measurement using light waves and automatic direction sensitive counting means.

Another object of the invention is to provide new and improved means for making precision measurements having three phase detector means.

Another object of the invention is to provide new and improved means for making automatic precision measurements of the order of one-twelfth of a wave.

Another object of the invention is to provide new and improved fringe counting means.

Another object of the invention is to provide new and improved adding subtracting fringe counting means.

These and other objects of the invention will be apparent from the following specification and drawings of which:

FIGURE 1 is a schematic plan view of part of the embodiment of the invention.

Figure 2:
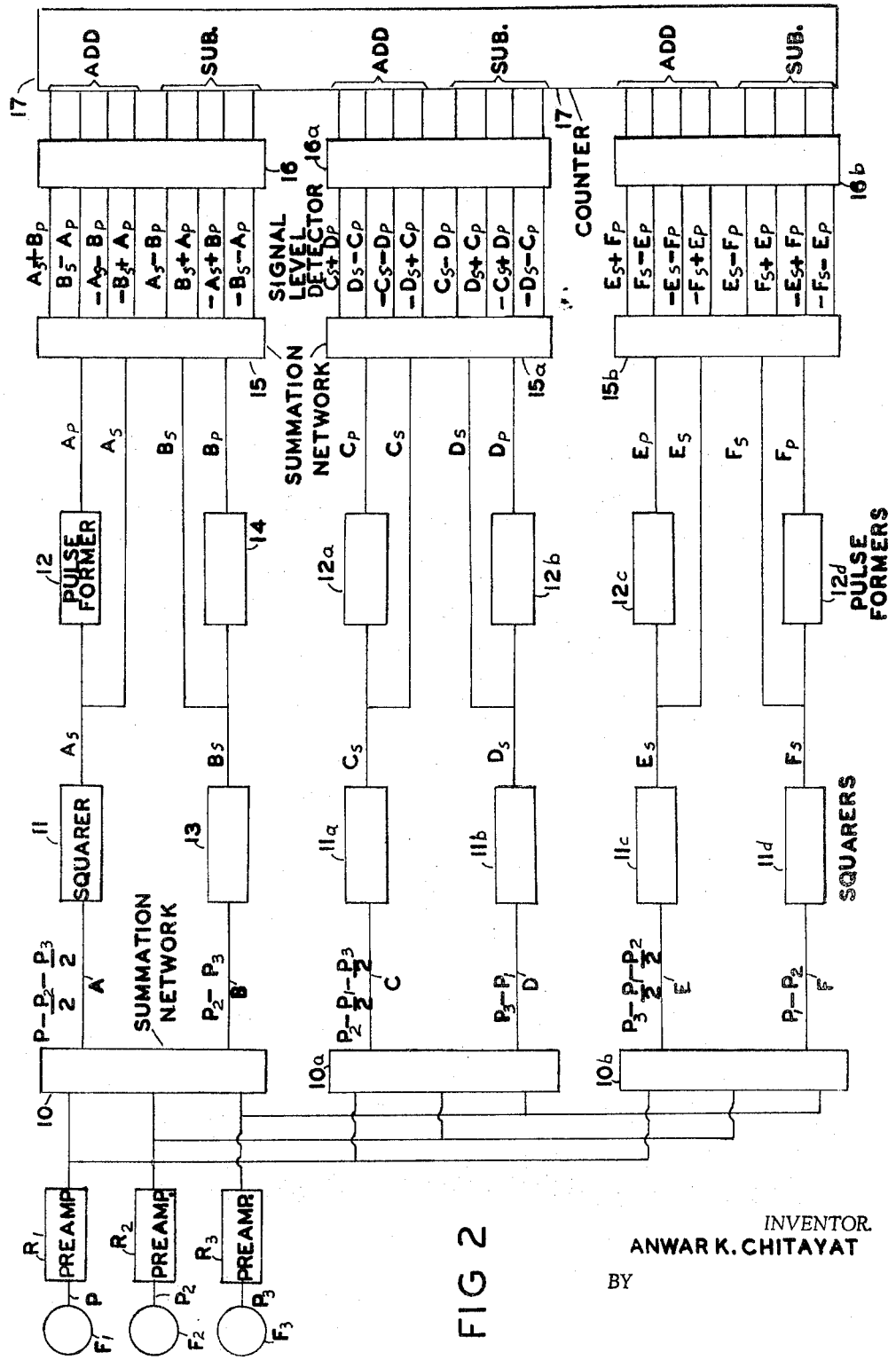
FIGURE 2 is a block diagram of the circuit of the embodiment of the invention.

FIGURES 3, 3a, 4, and 4a, are diagrams illustrative of the operation of the invention.

Referring to FIGURE 1, there is shown a modification of a Michelson type interferometer. Here, a monochromatic light source S is used with an aperture T. The illumination is collimated by lens $L_1$ and is directed onto the beam splitter G. The illumination is then separated in two parts:

(I) to a fixed position tetrahedral prism $C_1$, which is then reflected back to beam splitter G, at which a portion is reflected to the lens $L_2$; and (II) to a tetrahedral prism ($C_2$) mounted on movable member X and back to beam splitter G, and then to the lens $L_2$. The compensating plate E is added by the present invention as will be described.

All of the above elements are preferably mounted on a glass plate B, which is preferably at least one-half inch thick. The elements may be mounted in a conventional manner for instance, by cementing onto the glass plate.

2

If desired, adjustable mountings may be provided in conventional manner.

The light source S may be a Hg-198 source having a wavelength of 5461 angstroms which provides fringes approximately ten millionths of an inch.

In the Michelson type interferometer fringes are formed by the interaction of the light (I) and (II) such that the amplitude seen at lens ($L_2$) can be the summation of the illumination through (I) and (II) as a maximum, and their difference as a minimum.

The type of the interferometer described above has been used in many applications where automatic measurement is desired. However, means must be added to detect direction of movement and in addition to develop a counting system which is insensitive to light level changes and contrast as well as amplifier sensitivity.

The following is a description of a unique detection scheme which results in the following:

(I) Direction sensing.
(II) A sensor whose operation is independent of slight variation of illumination level, or contrast.
(III) A scheme whereby fractions of a fringe can readily be counted to as low as $\frac{1}{12}$ of a fringe, with a resultant increase in sensitivity.

FIGURE 1 illustrates the arrangement of the sensor means. Multilayer coatings 1–6 are deposited on the compensating glass plate E. The coatings may be magnesium fluoride or silicon monoxide. The coatings are applied so as to retard the light so that it changes optical path in the following manner.

Areas 1 and 6: L/6 retardation
Areas 2 and 5: L/3 retardation
Areas 3 and 4: No retardation
Where $L$=wavelength The illumination enters the compensating plate twice. Thus, if it enters at Area 1, it is directed to the tetrahedral prism $C_2$ and is reflected back at Area 6. In the same manner, the beam entering Area 2, passes through Area 5 in its return path. Also, that entering Area 3 exits through Area 4.

Consequently, any beam entering through any of the areas results in a double path retardation in the following manner.

Areas 1 and 6: L/3 retardation
Areas 2 and 5: 2L/3 retardation
Areas 3 and 4: No retardation.

It may be noted from the above that if one replaces the tetrahedral prisms by mirrors, the same retardations will result as shown above, except that the illumination reflects back in the same area twice. Consequently, the system described above is equally suited for mirrors as for prisms. However, if mirrors only are used, only three areas are sufficient instead of six.

Based on the above, it may be seen that if one moves the tetrahedral prism $C_2$ in a reverse direction (toward B) at a constant velocity, then three sine wave shapes are developed as shown in FIGURE 3A; where $P_1$ represents areas 1 and 6; $P_2$ represents areas 2 and 5; and $P_3$ represents areas 3 and 4. The three areas cause a phase shift, so that $P_3$ lags $P_1$ by $120°=\frac{1}{3}$ of one fringe; and $P_2$ lags $P_1$ by $240°=\frac{2}{3}$ of one fringe.

The three areas are detected by three separate photomultipliers as shown in FIGURE 1. $M_1$ reflects the illumination or areas 3 and 4 onto the photomultiplier $F_3$ having output $P_3$. $M_2$ reflects areas 2 and 5 onto the photomultiplier $F_2$ having output $P_2$. Photomultiplier $F_1$ having output $P_1$ detects the illumination of areas 1 and 6.

In order to allow for the sensing of direction, it is desirable to obtain two electronic signals A and B which are 90° out of phase. This is achieved in the following manner. The output of the photomultiplier $F_3$ is subtracted from $P_2$ through a difference amplifier to result in $B=(P_2-P_3)$. While the quadrature signal A is obtained by the summation $$P = \frac{P2}{2} - \frac{P3}{2}$$

It is shown in FIGURE 3A(b) that these signals are out of phase by 90°.

In the above discussion, it was assumed that only A.C. signals are developed. However, in actual practice, it is not possible to obtain perfect contrast, so that the lowest signal is not zero but is above zero. In other words, it is possible to obtain a D.C. level which is added to all the other signals. This is caused by imperfection of optics, poor monochromaticity of the light source, or the introduction of background illumination. In any case, it is important to minimize the effects of this D.C. level which may vary in time and on the order of interference. The scheme described above allows the cancellation of the D.C. level. Thus, $(P_2-P_3)$ signal is independent of the D.C. level that is added to both $P_2$ and $P_3$ equally. In addition, the $$P_1 - \frac{P2}{2} - \frac{P3}{2}$$

signal is also independent of the D.C. levels added to $P_1$, $P_2$, and $P_3$ equally.

FIGURES 2, 3, and 3A illustrate the principle of operation of the detection system. The outputs from pickups $F_1$, $F_2$, and $F_3$ are fed to amplifiers $R_1$, $R_2$, and $R_3$. Summation network 10 provides the outputs $$A = P_1 - \frac{P2}{2} - \frac{P3}{2}$$

and $B=P_2-P_3$. A typical summation network is shown in "Radiation Laboratory Series" volume 19, chapter 18, section 2, published by McGraw-Hill. These signals represent the position of the moving tetrahedral prism $C_2$. Now, if $C_2$ is moved at a constant velocity, then alternating signals are developed, the sinusoidal response of the photomultipliers being shown in FIGURE 3. If the direction of movement is forward, $P_1$ lags $P_2$ which in turn lags $P_3$ by $L/3=120°$ intervals.

On the other hand, if the direction is reversed, FIGURE 3A, (a) then $P_1$ leads $P_3$ which in turn leads $P_2$ by 120° steps. A vector diagram is shown in FIGURE 4. The direction of rotation of the vectors reverse due to reversal of motion. Consequently, a forward motion results in a vector A which lags B by 90°, while a reverse motion results in vector A leading B by 90°.

The block diagram, FIGURE 2, shows an electronic Schmidt trigger circuit 11, which squares the sinusoid A into a square wave $A_s$, FIGURE 3(c), which a pulse former 12 converts to a pulse $A_p$, FIGURE 3(e), at the point of zero crossover of the square wave. Similarly, square wave generator 13 provides square wave $B_s$ and pulse former 14 provides pulses $B_p$. The wave shapes of $A_s$, $A_p$, $B_s$, and $B_p$, are shown in FIGURES 3(c) through 3(f). Another summation network 15 adds the signals from the square wave generators and the pulse formers to result in the following:

(I) $A_s+B_p$: FIGURE 3g—Here the square of A is added to the pulse of B. Consequently, if the direction of movement is forward as in FIGURE 3g, then the pulse is above the square wave with a high positive value. On the other hand, if the direction is reversed, then the pulse is below the square wave, FIG. 3A(g).

A signal level detector 16 is connected to network 15 so that only those signals which are above the square wave are passed to the conventional counter 17. The counter contains two inputs, add and subtract, the first allows it to add a digit per pulse, while the other subtracts a digit per pulse. The signal $A_s+B_p$ is connected to the add portion of the counter, consequently, when the signal is above the level shown in FIGURE 3g, the counter adds a digit. When the motion is reversed, no pulse is present above the triggering level, since all pulses present within the $A_s+B_p$ output will be below the level of the square wave.

(II) $A_s-B_p$: This signal is allowed to trigger the subtracting section of the counter, as shown in FIGURE 3A(k). Here, if the motion is forward, the signals are below the square wave, and no pulse is allowed to trigger the counter. On the other hand if the direction is reversed, then $A_s-B_p$ results in a signal above the square wave, FIGURE 3A(k), which exceeds the triggering levels so that now a digit is subtracted.

It may be seen from the above that if only $A_s+B_p$ is connected to the "add" section while $A_s-B_p$ is connected to subtract side, then one pulse is developed per fringe, and reversible counting is achieved.

The configuration of the detector array allows the increase of the number of counts per fringe. Thus, the add section of the counter can be connected to $(A_s+B_p)$, $(B_s-A_p)$, $(-A_s-B_p)$, and $(-B_s-A_p)$, FIGURES 3g, 3h, 3i, and 3j, resulting in four counts per fringe. In addition to the above, the subtract function can similarly be actuated by $(A_s-B_p)$, $(B_s+A_p)$, $(-A_s+B_p)$, and $(-B_s-A_p)$, FIGURES 3k, 3l, 3m, and 3n.

Further increase in sensitivity is possible by the inherent capability of the three photomultiplier scheme. Thus, as shown above it is possible to obtain four pulses per fringe which are located 90° apart. It is also possible to obtain twelve counts per fringe as shown in FIGURE 2, where the spacing between counts is 30°. This is achieved by comparing the value of $$\left(P_2 - \frac{P1}{2} - \frac{P3}{2}\right) = C$$

with that $(P_3-P_1)=D$ are provided by summation network 10a. These vectors are shown to be in quadrature in FIGURE 4. Consequently, four add pulses or four subtract pulses can be developed in the same manner described previously, by squarers 11a and 11b, pulse formers 12a and 12b, network 15a and signal level detector 16a.

The third quadrature combination is $$\left(P_3 - \frac{P1}{2} - \frac{P2}{2}\right) = E$$

with $(P_1-P_2)=F$, which are provided by summation network 10b, which also results in four pulses per fringe by means of squarers 11c and 11d, pulse formers 12c and 12d, network 15b, and signal level detector 16b. The total maximum number of pulses per fringe formed by combining A & B, C & D, E & F, are 12; any selection from 1 to 12 counts per fringe are possible by merely connecting the proper outputs to the add-subtract counter 17.

The versatility of the above scheme as well as the independence of the counting on light levels and contrast results in a unique detection scheme having great value in instrumentation and measurement.

Therefore, the measuring interferometer of the present invention with its precision optical components produces optical fringes developed by an internal light source. Counting a number of fringes determines distance traveled. The wavelength used is produced by a Hg-198 light source with a filtered frequency of 5461 angstroms.

The stability of measurement with the present invention is assured by unique method of mounting the optics that do not require adjustment after extended usage. A split phase, three photomultiplier detection gives highly accurate reversible sensing of fringes, independent of reasonable variation of input voltage, environmental conditions, and time of operation.

For operation, the sensor is normally mounted stationary. A travelling tetrahedral prism is mounted on the moving body whose location it is desired to determine. As the body moves, light wave fringes are formed and are counted, between the tetrahedral prism and the sensor representing its exact displacement to a repeatable accuracy.

Automatic optical fringe counting is achieved by a novel detection scheme using three photomultipliers. The combination of optics and electronics assures that accurate measurements are obtained independent of vibrations or overshoot of the measured table. A numerical unambiguous output is developed in a counter which may have a visible display calibrated in increments of the order of ten millionths of an inch. The counter can be used for automatic readout, on punch tape, punch card or magnetic tape.

The present invention is a universal system adapted to measure either distance or angles. If desired, angular rates or linear rates over time may also be measured to an unprecedented accuracy.

I claim:
1. In a phase measuring system,
    means to provide a phase reference signal,
    means to provide an adjustable phase signal,
    means to measure phase shift of said adjustable phase signal with respect to said reference signal by counting fractional wavelengths comprising,
    means in the path of said adjustable signal to produce first, second and third signals from said adjustable phase signal, said first, second and third signals being 120° apart in phase,
    means in the paths of said signals to combine said first, second, and third signals with said phase reference signal to provide first, second, and third combined signals,
    means in the paths of said signals to detect said first, second and third combined signals and provide detected signals,
    first summation network means connected to said detector means to combine said detected signals to provide a first pair of fourth and fifth sine wave signals separated by 90° and a second pair of sixth and seventh sine wave signals separated by 90° in phase, said pairs of signals being separated by 120°,
    means connected to said combining means to make square waves of said fourth, fifth, sixth and seventh signals,
    means connected to said square wave means to differentiate said fourth, fifth, sixth, and seventh signals to provide pulses,
    summation means connected to said square wave means and said pulse means to combine said square wave signals and said pulses to provide add signals when said adjustable phase signal moves in phase in one direction with respect to said phase reference signal and to provide subtract signals when said adjustable phase signal moves in the opposite direction,
    and add-subtract counter means connected to said second summation network means.

2. In a phase measuring system,
    means to provide a phase reference signal,
    means to provide an adjustable phase signal,
    means to measure phase shift of said adjustable phase signal with respect to said reference signal by counting fractional wavelengths comprising,
    means in the path of said adjustable signal to produce first, second and third signals from said adjustable phase signal, said first, second and third signals being 120° apart in phase,
    means in the paths of said last signal to combine said first, second, and third signals with said phase reference signal to provide first, second, and third combined signals,
    means in the paths of said last signal to detect said first, second, and third combined signals and provide detected signals,
    first summation network means connected to said detector means to combine said detected signals to provide a first pair of fourth and fifth sine wave signals separated by 90°, a second pair of sixth and seventh sine wave signals separated by 90°, a third pair of eighth and ninth sine wave signals separated by 90°, said pairs of signals being separated by 120°,
    means connected to said last means to make square waves of said fourth, fifth, sixth, seventh, eighth and ninth signals,
    means connected to said last means to differentiate said fourth, fifth, sixth, seventh, eighth and ninth signals to provide pulses,
    second summation network means connected to said square wave means and said pulse means to combine said square wave signals and said pulses to provide add signals when said adjustable phase signal moves in phase in one direction with respect to said phase reference signal and to provide substract signals when said adjustable phase signal moves in the opposite direction, and
    add-substract counter means connected to said last means to count said purse signals thereby measuring said phase shift of said adjustable phase signal.

3. In a cycle counting means comprising,
    means to provide a phase reference signal,
    means to measure phase shift of said adjustable phase signal with respect to said reference signal by counting fractional wavelengths comprising,
    means connected to receive said adjustable phase signal and to produce first, second and third signals from said adjustable phase signal, said first, second, and third signals being 120° apart in phase,
    means connected to said last means to combine said first, second, and third signals with said phase reference signal to provide first, second and third combined signals,
    means connected to said last means to detect said first, second and third combined signals and provide detected signals,
    first summation network means connected to said last means to combine said detected signals to provide a plurality of pairs of sine wave signals separated by 90° in phase, each of said pair of signals being separated by 120°,
    means connected to said last means to make square waves of said pairs of signals,
    means connected to said last means to provide pulses from said pairs of signals,
    second summation network means connected to said square wave and pulse means to combine said square wave signals and said pulses to provide plus signals when said adjustable phase signal moves in one direction with respect to said phase reference signal and to provide minus signals when said adjustable phase signal moves in the opposite direction, and
    plus-minus counter means connected to said last means to count said pulse signals thereby counting fractional cycles of phase shift.

References Cited by the Examiner

UNITED STATES PATENTS

| | | | |
|---|---|---|---|
| 2,835,445 | 5/1958 | Stephans | 235—92 |
| 3,127,465 | 3/1964 | Stephans | 88—14 |

FOREIGN PATENTS

| | | |
|---|---|---|
| 1,074,643 | 2/1960 | Germany. |

WALTER L. CARLSON, *Primary Examiner.*

P. F. WILLE, *Assistant Examiner.*